J. HERDLEIN.
DISK CULTIVATOR.
APPLICATION FILED DEC. 19, 1914.
1,164,518.
Patented Dec. 14, 1915.
3 SHEETS—SHEET 3.
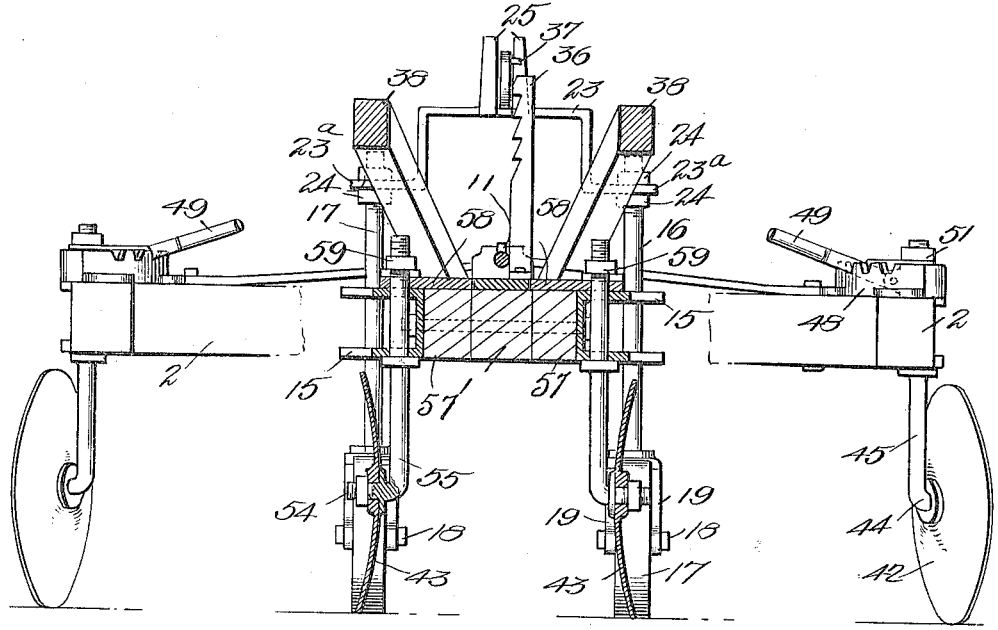
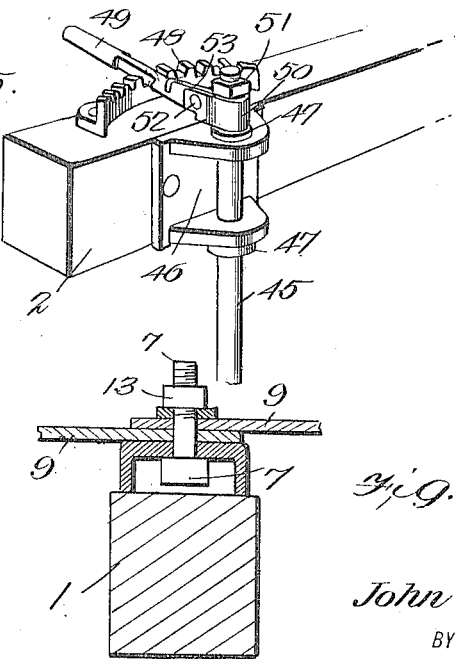
WITNESSES
INVENTOR
John Herdlein
BY
ATTORNEYS

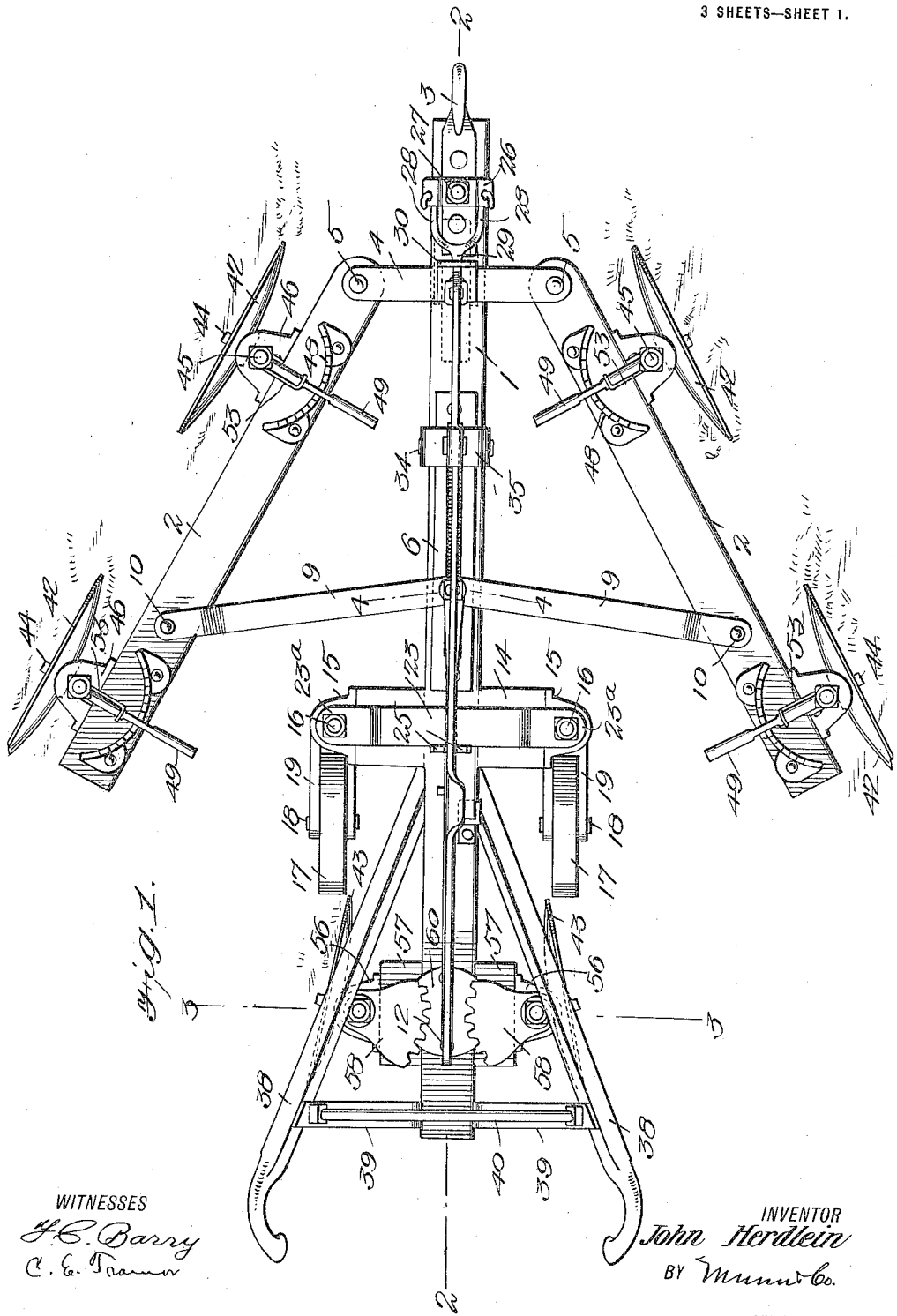

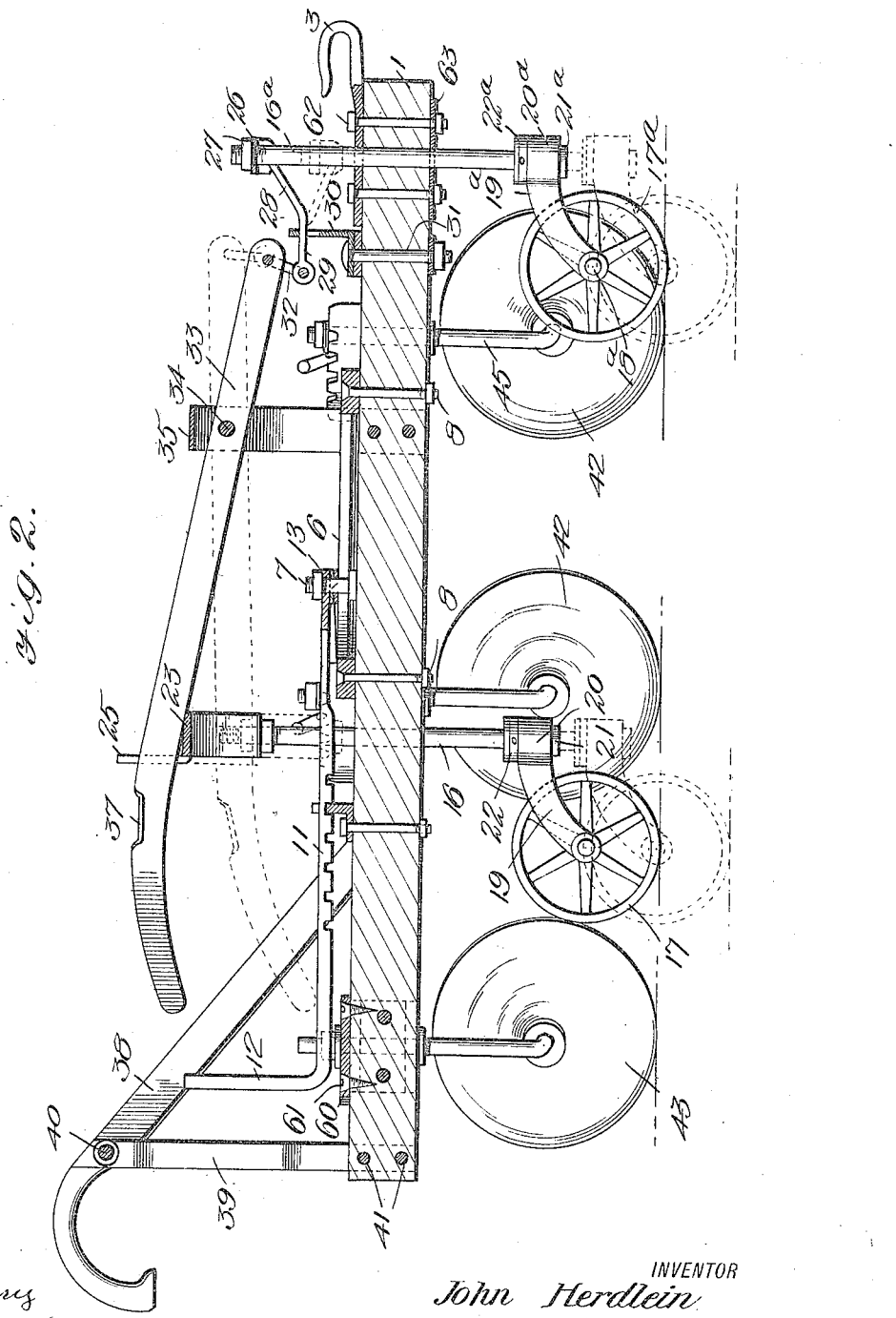

UNITED STATES PATENT OFFICE.

JOHN HERDLEIN, OF VINELAND, MISSOURI.

DISK CULTIVATOR.

1,164,518.  Specification of Letters Patent.  Patented Dec. 14, 1915.

Application filed December 19, 1914. Serial No. 878,087.

*To all whom it may concern:*

Be it known that I, JOHN HERDLEIN, a citizen of the United States, and a resident of Vineland, in the county of Jefferson and State of Missouri, have invented a new and useful Improvement in Disk Cultivators, of which the following is a specification.

My invention is an improvement in disk cultivators, and has for its object to provide a cultivator of the character specified, capable of adjustment as to the depth of the cut of the disks, and as to the quantity of soil thrown by the disks, and as to the lateral position of the disks, and the width of the rows, and wherein the cultivator is especially designed for hard ground, and for destroying weeds, and for leaving a fine mulch on the surface.

In the drawings:—Figure 1 is a top plan view of the improved cultivator, Figs. 2, 3 and 4 are sections on the lines 2—2, 3—3, and 4—4, respectively, of Fig. 1, and Fig. 5 is a perspective view showing the adjusting mechanism for the disks.

The present embodiment of the invention consists of a central frame, comprising a bar 1 and lateral bars 2, connected to the central bar in a manner to be presently described, and the central bar is provided with a hook or clevis 3 at its front end for permitting draft apparatus to be attached to the cultivator.

A plate 4 is arranged transversely of the bar 1 near the front end thereof, and the front ends of the lateral bars 2 are pivoted to the ends of the plate by means of bolts and nuts 5. A guide 6 is mounted on the upper face of the bar 1 intermediate its ends, and a bolt 7 is mounted to slide in the guide. The guide is provided with a longitudinal slot, and the walls of the slot are undercut so that the head of the bolt may engage within the undercut portion to prevent disengagement of the bolt. The guide is connected to the bar 1 by means of bolts and nuts 8, and plates 9 connect the bars 2 near their rear ends with the bolt. Each plate 9 is pivoted to the adjacent bar 2, by means of a bolt and nut 10, at one end of the plate, and the other end of the plate engages the bolt 7. A handle in the form of a link 11 having an angular arm 12 at its rear end is connected with the bolt, the front end of the link having an opening through which the bolt passes, and a nut 13 is threaded on to the bolt above the link. It will be obvious that when the bolt is moved longitudinally of the guide by means of the link 11, the rear ends of the bars 2 will be moved toward or from the bar 1, depending upon the direction of movement of the bolt.

The bar 1 is provided with a cross head 14, just in rear of the guide 6, and U-shaped bearing brackets 15 are secured to the ends of the cross head. Shafts 16 are journaled in the brackets, each shaft supporting a caster wheel 17 at its lower end. Each caster wheel 17 is journaled on a shaft 18 mounted in the arms 19 of a fork, whose body 20 is a bearing fitting the lower end of the adjacent shaft 16. The bearing is held in adjusted position, by means of a head 21 on the lower end of the shaft and collars 22 above the bearing.

The shafts 16 are rotatable in the bearing brackets 15, they are also movable vertically in the said brackets, and the shafts are connected at their upper ends by a cross plate comprising a body 23 and ends 23$^a$ offset downwardly from the body and integral therewith. Each of the ends 23$^a$ has an opening through which extends the adjacent shaft and lock nuts 24 are threaded on to the shaft above and below the said ends of the plate. The body 23 of the plate is provided with a pair of upstanding lugs 25 spaced apart from each other, for a purpose to be presently described.

A shaft 16$^a$ similar to the shafts 16, is mounted to rotate and to move vertically in an opening in the front end of the bar 1, and the lower end of the shaft supports a caster wheel 17$^a$ corresponding to the wheel 17. The wheel is journaled on a shaft 18$^a$ held in bearings in the arms 19$^a$ of a fork whose body 20$^a$ is held on the shaft between a head 21$^a$ on the lower end thereof, and collars 22$^a$ above the bearing. Both the collars 22 and 22$^a$ are adjustable, being held by set screws or the like on the shaft.

A plate 26 is held on the upper end of the shaft, the plate having an opening through which the shaft extends, and a nut 27 is threaded on to the shaft above the plate. The arms 28 of a fork are engaged with openings in the ends of the plate 26 and the body 29 of the fork passes through an opening in the vertical portion of an angle bracket 30, secured to the bar 1, by means of a bolt and nut 31.

A link 32 pivotally connects the body of the fork with the front end of a lever 33, which is pivoted intermediate its ends as indicated at 34, between the arms of a substantially U-shaped bracket 35, supported by the bar 1 of the frame. The lever 33 passes above the body 23 of the connecting plate for the shafts 16, fitting between the lugs 25, and the rear end of the lever is in position for grasping by the operator of the cultivator who walks behind the same.

A toothed bar 36 is secured to the bar 1 near the rear end of the lever 33, and the teeth of the bar are in position to engage a lateral flange 37 on the lever near its rear end to hold the lever from upward movement. When the rear end of the lever 33 is depressed as indicated in dotted lines in Fig. 2, the shafts 16 and 16$^a$ will be forced downwardly, the arms 28 of the fork 28—29 moving downward when the body is moved upward, while the rear end of the lever will press down the connecting plate 23—23$^a$.

The shafts are so arranged normally, that is, when the lever is in the full line position of Fig. 2, that the wheels 17 and 17$^a$ will just touch the ground. That is, the wheels will run along upon the ground, moving upward, as the disks to be later described, cut into the ground. Whenever it is desired to support the cultivator with the disks out of contact with the ground, or in inoperative position, the rear end of the lever is depressed as indicated in dotted lines in Fig. 2 until the flange 37 will engage a tooth of the bar 36. As the lever is depressed the shafts 16 and 16$^a$ are pressed downwardly, and the frame is lifted. The bars 2 may be moved toward or from the bar 1 by means of the link 11. When the handle 12 is grasped and the link is moved longitudinally the bolt 7 is also moved in the guide and depending upon the direction of movement the rear ends of the bars 2 will be moved toward or from the bar 1.

A pair of handles 38 is connected to the bar 1 near the cross head 14 and in rear of the same, the said handles being braced against the rear end of the bar 1 by braces 39, and being connected by a rung 40 at the braces. The lower end of the braces are lapped upon the rear end bar 1 and are connected thereto by bolts 41.

A pair of concavo-convex disks 42 is connected with each lateral bar 2, and a pair of similar disks 43 is connected with the bar 1 near its rear end. Each of the disks 42 is journaled on a journal pin 44 at the lower end of the shaft 45, and each of the shafts 45 is journaled in the arms of a substantially U-shaped bearing bracket 46 secured to the adjacent bar 2. One of the brackets 46 is secured to the bar 2 near each end thereof, and the shafts are held from longitudinal movement by collars 47 above and below the bearing bracket. A toothed sector 48 is secured to the bar 2 adjacent to each bearing bracket, each sector being adapted for engagement by a lever 49 pivoted to a split ring 50 held on the upper end of the shaft 45 between the uppermost collar 47 and a nut 51 threaded on to the shaft. The ends of the split ring 50 are pivoted to the lever as indicated at 52, and a spring 53 is provided for holding the lever in engagement with the teeth of the segment. It will be evident that when any lever 49 is released from the adjacent segment, the shaft 45 connected with the lever may be turned to change the inclination of the disks 42 with respect to the direction of motion of the frame.

The disks 43 are journaled on journal pins 54 at the lower ends of shafts 55, which are mounted to rotate in bearing brackets 56, arranged on the opposite sides of the bar 1, near its rear end. The bearing brackets 56 are spaced apart from the bar by means of blocks 57, and a toothed segment 58 is secured to the upper end of each shaft 55, by means of a bolt 59. The teeth of the segments 58 mesh with teeth on opposite sides of a plate 60 which is secured to the upper face of the bar 1 between the segments 58, by means of screws 61, or the like. When it is desired to change the inclination of the disks 43 the nuts 59 are loosened to permit the plates 58 to be lifted until the teeth thereof will disengage from the teeth of the plate 60. When the disk is adjusted to the proper angle, the segment is lowered until the teeth again engage the teeth of the plate 60. The disks are thus held in adjusted position.

In use, when the cultivator is not in operation, the lever 33 is operated to move the wheels 17 and 17$^a$ downward to lift the frame and the disks above the level of the ground. The cultivator is now supported by the wheels 17 and 17$^a$ and it may be transported wherever desired without injuring anything over which it passes, and without any danger of dulling or injuring the disks. When it is desired to bring the disks into operation, the lever 33 is released from the bar 36. The disks now engage the ground and as they sink into the ground, the wheels 17 and 17$^a$ will be moved upward running on the surface and offering no impediment to the action of the disks.

The disks 42 may be moved toward or from the bar 1, to widen or narrow the cultivated area, and all of the disks may be swung on a vertical axis to vary the inclination thereof to the direction of motion of the machine. The hook 3 is held to the front end of the bar 1, by means of bolts and nuts 62, and a plate 63 is arranged below the bar, the bolts passing through the bar and the nuts engaging the bolts below the bar.

The improved cultivator is especially adapted for use when the corn is too high to be cultivated with the ordinary two-horse cultivator, and the cultivator will finish a row as efficiently as a two-horse cultivator. The two-horse implement moves astride the row, while the present implement will work between the adjacent rows and will cultivate all of the soil between the rows, making a good fine mulch, since the disks are cutting the soil continuously and not tearing up the land in lumps. Neither do the disks injure the roots of the plants, as will a hoe or shovel and as the disks revolve while working the draft is much lighter than a hoe or shovel cultivator. The cultivator can be used with any crop that requires cultivation and the disks may be set to hill corn or potatoes when required.

I claim:—

1. A disk cultivator, comprising a supporting frame, consisting of a central and lateral bars, a pivotal connection between the front ends of the lateral bars and the central bar, means on the central bar and connected to the lateral bars near their rear ends for moving the said ends laterally toward and from the central bar, disks supported by the bars, a shaft mounted for vertical sliding movement at the front end of the central bar, said bar having a cross head intermediate its ends, a shaft mounted for vertical sliding movement in each end of the cross head, a fork for each shaft, each fork comprising a body having a bearing journaled on the shaft, and arms extending approximately parallel from the bearing, a wheel journaled in each pair of arms, and means for simultaneously moving the three shafts downwardly, said means comprising a bracket on the central bar, a lever pivoted to the bracket intermediate its ends, a plate connecting the upper ends of the pair of shafts, said plate lying beneath the lever on the opposite side of its pivoted connection from the front shaft, a link pivoted at one end to the upper end of the front shaft, a fixed support on the central bar beneath which the link passes, and a pivotal connection between the front end of the lever and the link.

2. A disk cultivator, comprising a supporting frame, consisting of a central and lateral bars, a pivotal connection between the front ends of the lateral bars and the central bar, means on the central bar and connected to the lateral bars near their rear ends for moving the said ends laterally toward and from the central bar, disks supported by the bars, a shaft mounted for vertical sliding movement at the front end of the central bar, said bar having a cross head intermediate its ends, a shaft mounted for vertical sliding movement in each end of the cross head, a fork for each shaft, each fork comprising a body having a bearing journaled on the shaft, and arms extending approximately parallel from the bearing, a wheel journaled in each pair of arms, and means for simultaneously moving the three shafts downwardly.

3. A disk cultivator, comprising a supporting frame, consisting of a central and lateral bars, the lateral bars being pivotally connected to the central bar at their front ends, means on the central bar for moving the rear ends of the lateral bars toward and from the central bar, a plurality of bearing brackets on each lateral bar, a pair of bearing brackets on the central bar near the rear end thereof, a shaft journaled in each bearing bracket, a concavo-convex disk journaled on the lower end of each shaft, means in connection with each shaft of the lateral bars for oscillating the shaft and for holding it in adjusted position, means in connection with the pair of shafts of the central bar for permitting the said shafts to be oscillated, and for holding them in adjusted position.

JOHN HERDLEIN.

Witnesses:
 EMMA REICHERT,
 R. B. JONES.